US008375219B2

(12) United States Patent
Westerinen et al.

(10) Patent No.: US 8,375,219 B2
(45) Date of Patent: Feb. 12, 2013

(54) PROGRAM AND OPERATION VERIFICATION

(75) Inventors: William J. Westerinen, Issaquah, WA (US); Hanumant Kumar Yadav, Issaquah, WA (US); Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 11/977,273

(22) Filed: Oct. 24, 2007

(65) Prior Publication Data

US 2009/0113210 A1  Apr. 30, 2009

(51) Int. Cl.
*G06F 21/00* (2006.01)

(52) U.S. Cl. ........................................................ 713/187
(58) Field of Classification Search .................... 713/187
See application file for complete search history.

(56) References Cited

U.S. PATENT DOCUMENTS

| 5,421,006 | A | 5/1995 | Jablon et al. |
| 6,026,016 | A | 2/2000 | Gafken |
| 6,546,482 | B1* | 4/2003 | Magro et al. ........................ 713/1 |
| 6,901,516 | B1* | 5/2005 | Howard et al. ................. 713/193 |
| 7,228,434 | B2 | 6/2007 | Zisowski |
| 2001/0032305 | A1* | 10/2001 | Barry ................................ 712/34 |
| 2003/0023856 | A1* | 1/2003 | Horne et al. ................... 713/187 |
| 2003/0196096 | A1 | 10/2003 | Sutton |
| 2003/0237007 | A1* | 12/2003 | Ramirez ......................... 713/300 |
| 2004/0117616 | A1* | 6/2004 | Silvester ......................... 713/155 |
| 2005/0010788 | A1* | 1/2005 | Craft .............................. 713/187 |
| 2005/0027987 | A1 | 2/2005 | Neufeld et al. |
| 2005/0076226 | A1 | 4/2005 | Boivie et al. |
| 2005/0132217 | A1 | 6/2005 | Srinivasan et al. |
| 2005/0204140 | A1 | 9/2005 | Maruyama et al. |
| 2005/0235154 | A1 | 10/2005 | Serret-Avila |
| 2005/0246525 | A1 | 11/2005 | Bade et al. |
| 2006/0015748 | A1* | 1/2006 | Goto et al. ..................... 713/190 |
| 2006/0161761 | A1 | 7/2006 | Schwartz et al. |
| 2006/0177061 | A1* | 8/2006 | Orsini et al. .................. 380/268 |
| 2006/0179483 | A1 | 8/2006 | Rozas |

(Continued)

FOREIGN PATENT DOCUMENTS

| JP | 2008-176506 A | 7/2008 |
| WO | WO-98/26535 A1 | 6/1998 |

OTHER PUBLICATIONS

Written Opinion for PCT/US2008/075016 mailed Mar. 12, 2009.

(Continued)

*Primary Examiner* — Gilberto Barron, Jr.
*Assistant Examiner* — David Le
(74) *Attorney, Agent, or Firm* — Westman, Champlin & Kelly, P.A.

(57) ABSTRACT

A security module may be used to verify integrity of an executable program and may also be used to verify execution of the executable program on a computer. The security module may directly read a computer memory by asserting bus master control of a system bus. The executable program may be directly verified by calculating a hash or may be indirectly verified by an intermediate program that calculates the hash and passes it to the security module. To verify operation, the executable program may cause an interrupt to be generated when the executable program is in a known state. An interrupt service routine may trigger the security module to read registers in the computer processor via a debug port. If either the verification of the executable program fails or the register values are inconsistent with operation of the executable program, the security module may interrupt operation of the computer.

14 Claims, 4 Drawing Sheets

U.S. PATENT DOCUMENTS

2007/0022480 A1 1/2007 Newman
2007/0094507 A1* 4/2007 Rush ............................. 713/176
2008/0155257 A1* 6/2008 Werner et al. ................. 713/168

OTHER PUBLICATIONS

International Search Report for PCT/US2008/075016 mailed Mar. 12, 2009.

Falcarin, et al., "Software Tampering Detection using AOP and mobile code", pp. 1-6.

Seshadri, et al., "Pioneer: Verifying Code Integrity and Enforcing Untampered Code Execution on Legacy Systems", Date: Oct. 23-26, 2005, pp. 1-16.

* cited by examiner

PROGRAM AND OPERATION VERIFICATION

BACKGROUND

There are many reasons to verify program integrity. Security is often one of the more significant reasons. It may be desirable to have some assurance that boot programs are authorized and intact before they are executed. Similarly, e-commerce routines may have access to account information and passwords, and as such, it may be desirable to have an assurance that the program that is operating is approved by parties with a financial stake in a transaction.

Many techniques have been described that validate the integrity of code before it is executed. Most often, a trusted routine in the boot program or operating system verifies a hash or other digital signature of a program or utility immediately prior to its execution. However, virtual memory paging and multiprocessing, i.e. execution of more than one program at a time, make verification of a running program difficult, if not impossible.

SUMMARY

A security module may be used to validate an executable of interest, for example, an application, utility, etc. The security module may be used to validate running code by generating a hash of a given portion of memory and comparing the generated hash with a known hash. When a large program is to be checked, page faults can be generated to load the entire program into physical memory for checking.

In some embodiments that incorporate certain bus architectures, such as peripheral control interconnect express (PCIe), the security module may assert control of the bus and then directly verify a program currently in memory.

However, because of memory and speed limitations in the security module, directly hashing a large program may tax the resources of the security module. To address this, a hash verification routine (HVR) may be more or less permanently loaded in memory and directly verified by the security module. In turn, the HVR may be used to take the hash of a program of interest and submit the hash to the security module for verification against the known hash. The security module may periodically or at random intervals verify the HVR. The HVR may be easier for the security module to verify because of the HVR's small size and know location in memory.

In some embodiments the program of interest may generate an interrupt and an interrupt service routine may trigger the security module to verify the program. When using processors that support a hardware debugging tool (HDT), the interrupt service routine may allow the security module to directly download internal processor registers as part of the verification of both the correctness of the program of interest, but also as a verification that it is, in fact, executing.

A number of checks may be performed by the security module to ensure that the security module gets a sufficient number of opportunities to verify a running program. The security module may cause an interruption of service in cases where the verification of the HVR fails, the verification of the operating program of interest fails, or the security module does not get sufficient opportunities to verify the operating program.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
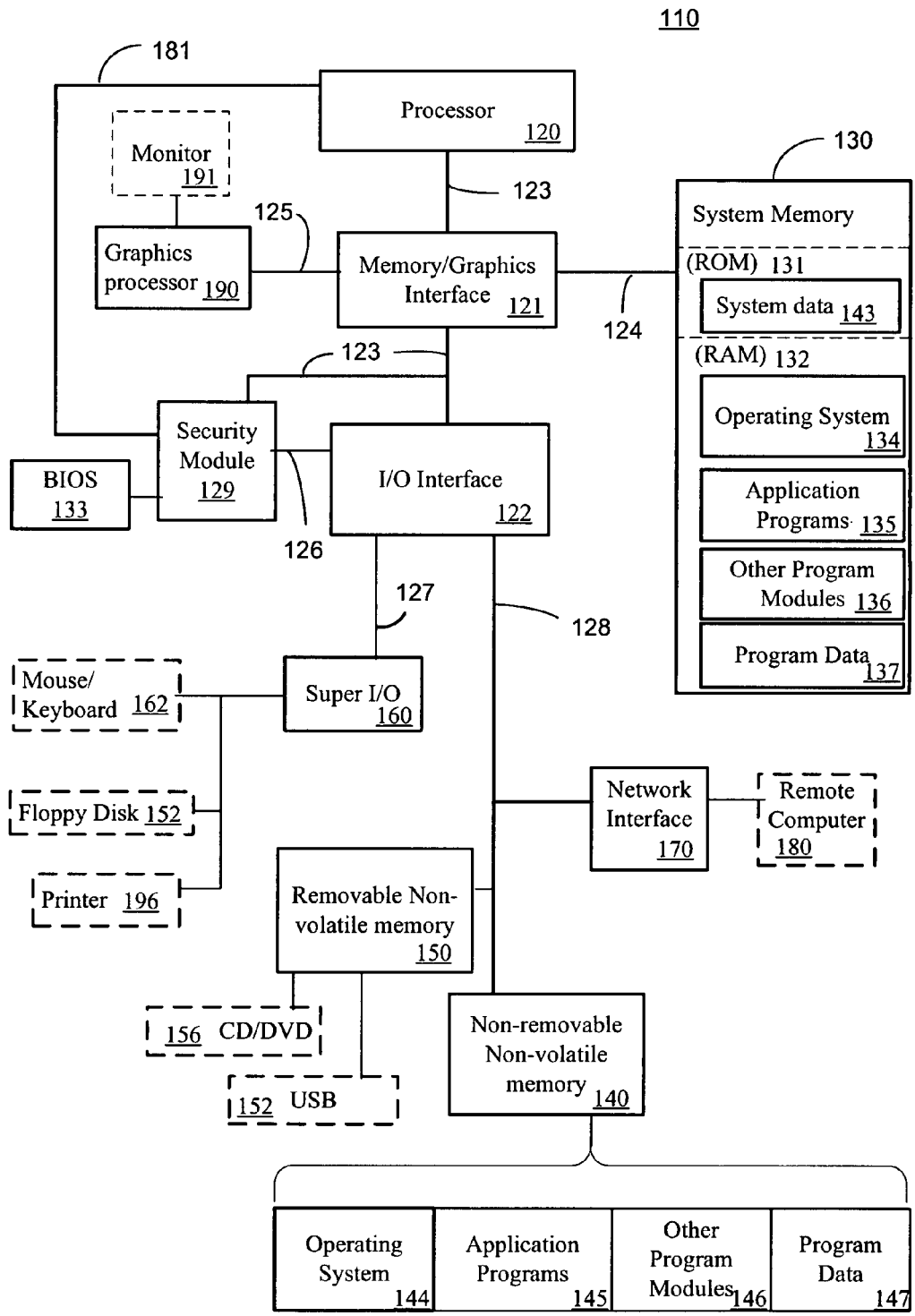
FIG. 1 is a block diagram of a computer supporting program operation and verification.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hyper Transport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies, such as ensuring certain programs are running. The security module 129 is discussed more below, especially with respect to FIG. 2. In various embodiments the security module 129 is coupled to the I/O interface 122 via the SPI bus 126, the system bus 123, or both. In some cases, where the processor architecture allows, a connection 181 between the security module 129 and the processor 120 may allow the security module 129 to use a hardware debug/test access port (not depicted) on the processor. Hardware debug ports exist in various brands of processors and allow direct read out of internal registers in the processor. In Intel processors, the hardware debug port is called a test access port (TAP) and in AMD processors, it is called a Hardware Debug Tool (HDT) debug port. The use of such ports by the security module 129 is discussed below.

A super input/output chip 160 may be used to connect to a number of 'legacy' peripherals, such as floppy disk 152, keyboard/mouse 162, and printer 196, as examples. The super I/O chip 122 may be connected to the I/O interface 121 with a low pin count (LPC) bus, in some embodiments. The super I/O chip 121 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
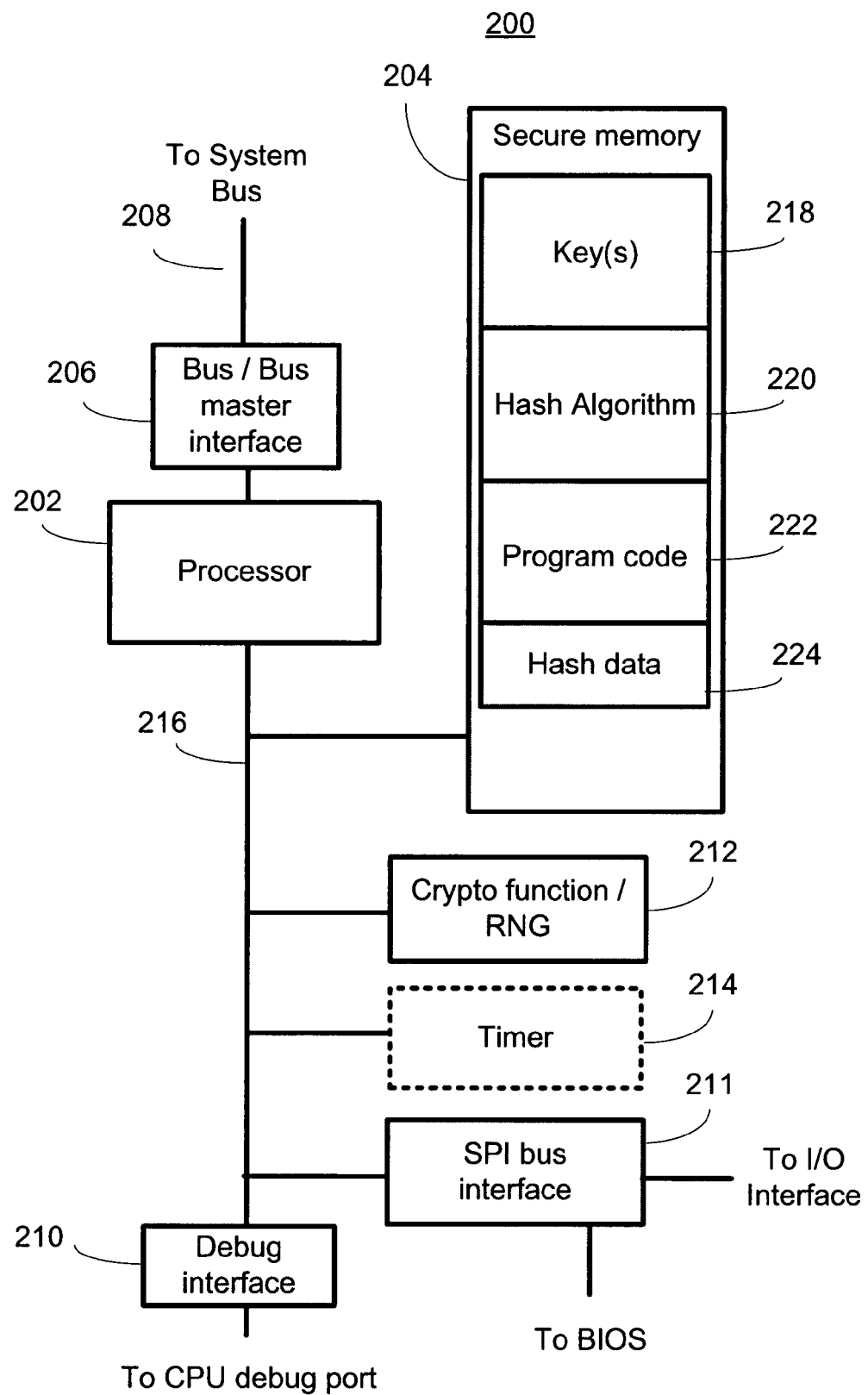
FIG. 2 is a block diagram of a security module.

FIG. 2 is a block diagram illustrating a security module 200, such as the security module 129 of FIG. 1. While the security module 200 may have many functions that contribute to either secure operation, metered operation, or subsidized operation, the following discussion highlights the use of the security module 200 in enforcing that executable code of interest is both un-tampered and actually being executed. The reasons for assuring both integrity and operation of executable code may include verification of executable code used for advertising placement, metering, compliance checking, etc. The executable code may either implement the desired function or assure that the desired function is running.

The security module 200 may have a controller or processor 202 for executing programmatic commands stored in a secure memory 204. The processor 202 may communicate via a system bus interface 206 that may be used to support communication over a system bus 208. The system bus 208 may be similar to the system bus 123 of FIG. 1 and may be a PCI, PCIe, or similar bus. The processor 202 may, when the system processor 120 of FIG. 1 supports it, use a debug interface 210 to communicate with a processor debug port. The processor 202 may additionally use a serial peripheral interface (SPI) bus interface 211 to support communication between the I/O Interface 122 of FIG. 1 with a basic input/output system (BIOS) memory, e.g. BIOS 133 of FIG. 1. In some embodiments, one or more BIOS images may be stored in the secure memory 204.

A cryptographic function 212 may be used to perform digital signature verifications, perform encryption and decryption functions, calculate hash values, etc. A timer 214 may be used to determine intervals, such as intervals between communications with a host or between execution of internal validation tests. The cryptographic function 212 may also include a random number generator.

The secure memory 204 may store both computer-executable instructions and data. For example, the secure memory 204 may store cryptographic keys 218, hash or other cryptographic algorithms 220 when such calculations are performed in software and not in the cryptographic function 212. Program code 222 in the form of computer-executable instructions may also be stored in the secure memory 204. Hash data 224 may also be stored in the secure memory 204. The hash data 224 may include a hash for each executable that is going to measured, and, in some embodiments, a hash of a hash verification routine.

In operation, the security module 200 may support a secure boot process by either providing a BIOS image stored in the secure memory 204, or validating a BIOS loaded through the SPI bus interface 211. After supporting the boot function, the security module 200 may directly validate executable code running in a computer housing the security module 200, such as computer 110 of FIG. 1. In order to read data in the computer memory 130 without the threat of malicious code running on the processor 120, the security module 200 may assert itself as a system bus master via the bus interface 206. When acting as a bus master, the security module 200 may use direct access to the memory 130 without threat of interference. The processor 202 may read the executable code out of an appropriate computer memory, such as application program memory 135, and perform a hash on the code as it is read. When the hash is calculated, it may be compared to known hash data 224 for the executable code stored in the secure memory 204. If the two hashes match, the security module 200 may wait for another verification cycle. If the two hashes don't match, the security module 200 may interrupt operation of the computer, for example, by causing a reset. If a more severe sanction is required, following the reset, a different BIOS may be supplied by the security module 200 that only allows very limited functionality.

Alternatively, the security module 200 may not have sufficient memory or processing speed to efficiently perform a hash of a large executable code. To accommodate such a limitation, a hash validation routine (HVR) may be executed by the computer 110. The HVR may be validated in the same manner as any other executable code, that is, read in from memory 135 (FIG. 1) over the system bus 208 and a hash value calculated. When complete, the calculated hash may be compared to a known hash previously stored with the hash data 224 in the secure memory 204. As above, if the hashes don't match the security module 200 may impose a sanction.

Because validation of code is only part of assuring that the executable code of interest is un-tampered and executing, a second step may be required, that of verifying actual execution of the code. To accomplish this, the executable code of interest may include a routine that calls an interrupt. A corresponding interrupt service routine (ISR) may send a signal to the security module 200 that the executable code of interest is at a known point of operation. The security module 200, upon receipt of the signal, may access the system processor 120 via the debug interface 210. Processors that support a debug interface allow a direct read out of internal registers, for example, the location of a program counter. When the program counter is set to a physical memory address that corresponds to the executable code of interest, there is some assurance that the executable code is, in fact, being run. Other processor register data may also indicate execution.

Figure 3:
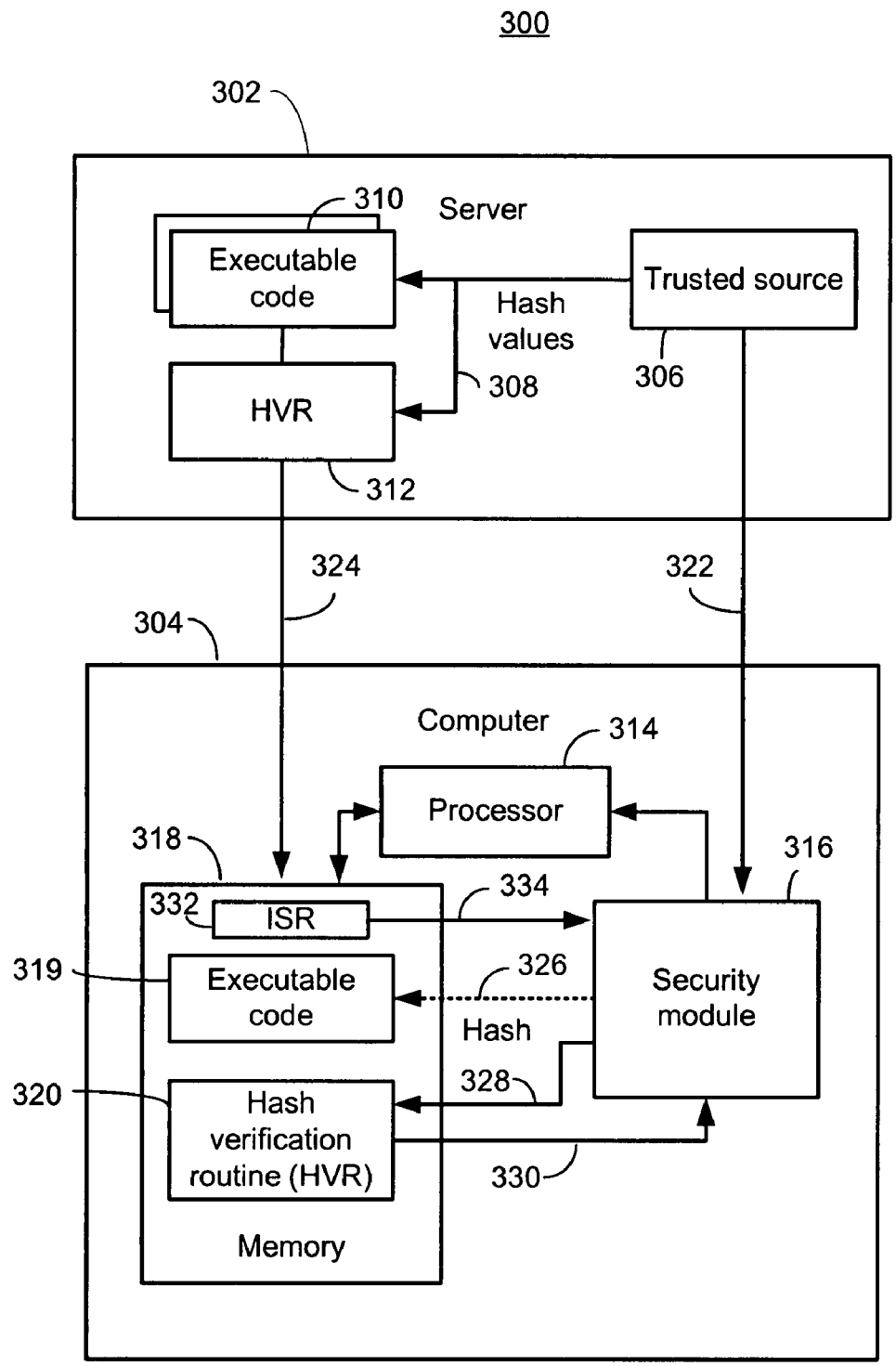
FIG. 3 is a system diagram for implementing program operation and verification.

FIG. 3 is a block diagram of a system 300 supporting program operation and verification. The system 300 may have both a server 302 and a computer 304. The server 302 may include a trusted source 306 that may be used to develop hash values over a link 308 for both executable code 310 and a hash validation routine 312.

The computer 304 may have a processor 314, a security module 316, and a memory 318, among other components (not depicted). The memory 318 may store both executable code 319 and a copy of the hash validation routine 320.

The trusted source 306 may establish a secure channel 322 with the security module 316 in order to transfer a trusted copy of the hash values for the executable code 310 and the HVR 312. The server may transfer copies of the executable code 310 and the HVR 312 over unsecured link 324 to create the computer copies of the executable code 319 and the HVR 320. Because these copies will be independently verified, there is no requirement that they be securely transferred.

In operation, after receiving the hash values over the secure link 322, the security module 316 may calculate a hash of the executable code 319 over link 326 and compare the hash with the value received from the trusted source 306.

Alternatively, the HVR 320 may first be verified by the security module 316 over link 328. The HVR 320 in turn may calculate a hash of the executable code 319 and transfer the hash to the security module 316 over the link 330.

Before or after verifying the hash of the executable code 318, verification that the executable code 319 is running may be performed. The executable code 319 may cause an interrupt to run an interrupt service routine 332 that may send a signal 334 to the security module 316. The security module 316 may then read internal data from the processor 314 using a debug port (not depicted), as described above. The internal data, for example, a program counter, page memory table, etc. may be used to determine that the executable code is running as expected.

Failure to verify either the hash or processor register values within a timeout period may result in the security module 316 causing a reset. Therefore, an attempt to starve the security module 316 from data by attacking links 328, 330, or 334 will have the same result as failing a verification test.

Figure 4:
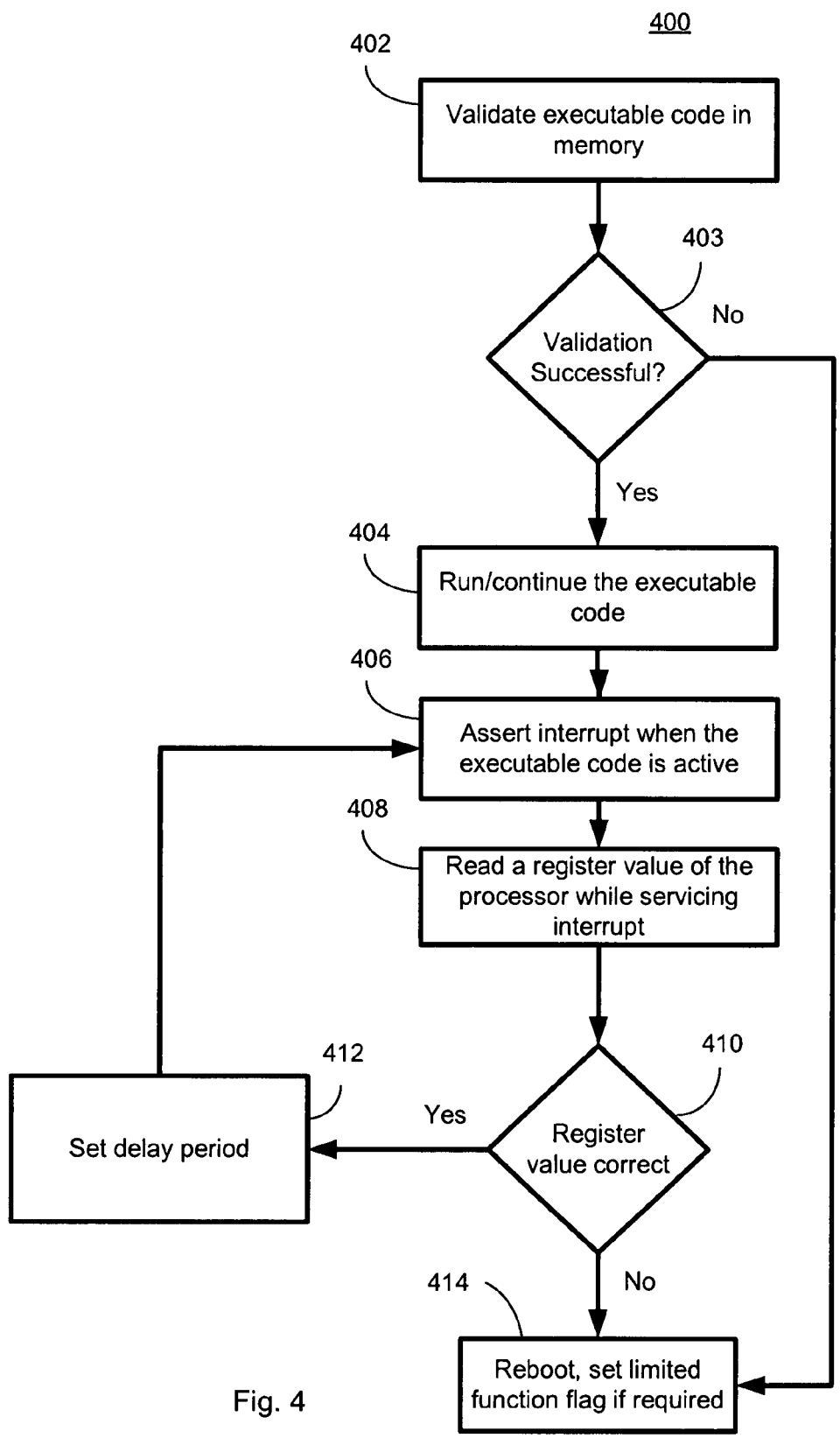
FIG. 4 is a method of performing program operation and verification.

FIG. 4 shows a method 400 of ensuring execution of validated code on a computer. At block 402, validation of an executable code 319 in a computer memory 318 may be performed. Validating the executable code 318 may include receiving a known hash of the executable code 319 from a trusted source 306. By asserting a page fault, the executable code 319 may be loaded into a physical memory 318, as opposed to virtual storage in a non-volatile memory, e.g. non-volatile memory 140 of FIG. 1. Once the executable code 319 is in physical memory, a hash may be calculated. The hash calculation may be performed directly by a security module 316.

Alternatively, the hash calculation may be performed by executing a hash validation routine 320, for example, when the executable code 319 is too large for the hash calculation to be easily performed in the security module 316. The HVR 320 may be smaller and more consistent than any number of executable code choices and versions. This may allow the security module 316 to more easily validate the HVR 320 by taking a second hash of the HVR 320 and comparing it to the known second hash received from the trusted source 306. Because the HVR 320 may be relatively small, it may be marked as non-pageable, so that it remains available in physical memory.

When the security module 316 calculates a hash, of either the executable code 319 or the HVR 320, the security module 316 may assert itself as a bus master and directly read the appropriate portion of physical memory 318. To improve the security of the validation process by making spoofing or denial of access attacks more difficult, the validation process, especially validation of the HVR 320 may be performed at a random interval. Storing an interval seed is discussed further below.

When the HVR 320 has been validated, the HVR 320 may then calculate a hash of the executable code 319 and forward that hash value to the security module 316 for comparison to a known hash of the executable code 319 received from the trusted source 306. The link between the HVR 320 and the security module 316 may be cryptographically secured. Alternatively, the HVR 320, immediately upon calculating the hash of the executable code 319 may signal the security module 316 to assert bus master control and read the hash value before a man in the middle attack could be mounted.

At block 403, the calculated hash may be compared to the known hash. When the values match, the 'yes' branch may be followed to block 404.

At block 404, after validation of the executable code 319 is complete, the executable code 319 may be run. During the operation of the executable code 319, at block 406, an interrupt may be asserted. This assumes the executable code 319 has been modified in anticipation of such validation. The interrupt may be asserted when the executable code 319 is at a point of execution having a known state and to be critical to proper execution of the executable code. These conditions allow verification that the executable code 319 is running because the state of the processor 314 can be predicted and may involve a portion of code that ensures the desired function is being carried out, for example, displaying an advertisement.

When the interrupt is asserted, an interrupt service routine 332 may be called. At block 406, the interrupt service routine 332 may signal the security module 316 to access the processor via a debug port (not depicted) on the processor 314. At block 408, the security module 316 may then read one or more register values in the processor 314. Because the executable code is at a precisely known state, the register values can be compared to predicted values at block 410. When the actual and predicted values match, the 'yes' branch from block 410 may be taken to block 412. The security module 316 may set a delay period for the next validation cycle by directly writing a value to a register used by the executable code 319 as a seed for calculating the next interval. Execution may then proceed normally until the next interrupt is asserted by the executable code 319 at the expiration of the interval.

If, at block 410, the register value or values read from the processor 314 do not match the predicted value or values, the 'no' branch from block 410 may be taken to block 414. At block 414, a flag may be set corresponding to whether the next boot cycle should use a normal BIOS or a restricted operation BIOS. When that is complete, a reset may be invoked. Whether the flag is set or not, the reset will cause all programs and variables to return to a known state and if the computer 304 is being tampered, the perpetrator will be inconvenienced. If the flag is set, the computer 304 may boot into a very limited mode where only debugging or, in the case of a pay-per-use computer, value may be added.

If, at block 403, the validation of the executable code 319 fails, the 'no' branch from block 403 may be taken to block 414, where the method may proceed as described above. The validation of the executable code 319 and verification that it is actually being executed are not necessarily linked. The activities at blocks 402 and 403 may be repeated at intervals determined by the security module 316.

The use of a security module with both bus master access to memory and debug access to a system processor allows a unique ability to verify both the contents of system memory and the state of the processor for verification of compliance with a policy, such as one requiring operation of a certain application or utility.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer comprising:
   a processor;
   a system bus;
   a memory storing a program of interest and a hash validation routine, the program of interest and the hash validation routine each executed by the processor; and
   a hardware security module communicatively coupled to the processor via the system bus, the security module comprising:
      a controller that is separate from the processor and performs integrity checks of the memory using an algorithm that generates a hash value over a portion the memory;
      a secure memory storing a first hash value for the program of interest and a second hash value of the hash validation routine;
      a port communicatively coupled to the processor for receiving a result from the hash validation routine and for performing an integrity check of the hash validation routine in the memory.

2. The computer of claim 1, wherein the security module further comprises a system bus master for directly reading the memory over the system bus when performing the integrity check.

3. The computer of claim 1, further comprising an independent path, that is independent of the system bus, between the security module and a debug port on the processor.

4. A method of ensuring execution of validated code on a computer, the method comprising:
   validating an executable code in a computer memory;
   running the executable code;
   asserting a processor interrupt when the executable code is active wherein asserting the processor interrupt comprises:
      asserting the processor interrupt from within the executable code while active;
      asserting the processor interrupt by the executable code at a point of execution having a known state and to be critical to proper execution of the executable code; and
      activating an interrupt service routine that triggers a security module to read a register value of a processor using a debug port on the processor while servicing the processor interrupt, the register value being indicative of execution of the executable code; and
      determining whether the register value is considered correct by comparing the register value to a predicted register value;
   rebooting the computer based on the comparison.

5. The method of claim 4, wherein validating the executable code comprises:
   receiving a known hash of the executable code;
   asserting a page fault to load the executable code into a physical memory;
   calculating a hash of the executable code in the physical memory; and
   comparing the hash to the known hash to validate the executable code.

6. The method of claim 5, wherein calculating the hash of the executable code comprises:
   calculating the hash of the executable code at a security module.

7. The method of claim 5, wherein calculating the hash of the executable code comprises:
   executing a hash validation routine;
   marking the hash validation routine as non-pageable to keep the hash validation routine in the physical memory;
   validating a second hash of the hash validation routine at a security module;
   generating the hash of the executable code using the hash validation routine;
   sending the hash of the executable code to the security module for comparison with the known hash of the executable code.

8. The method of claim 7, wherein validating the second hash of the hash validation routine comprises:
   asserting the security module as a bus master;
   directly reading a portion of the physical memory having the hash validation routine;
   calculating the second hash of the hash validation routine;
   comparing the second hash of the hash validation routine to a known second hash of the hash validation routine.

9. The method of claim 7, wherein validating the second hash of the hash validation routine comprises:
   validating the second hash of the hash validation routine at a random interval.

10. The method of claim 9, further comprising:
    writing a value generated in the security module into another register in the processor; and
    using the value to calculate a delay period for asserting a next processor interrupt.

11. A security module embedded in a computer, the security module comprising:
    a security module processor;
    a system port supporting communication over a system bus of the computer and further capable of asserting the security module as a system bus master;
    a serial peripheral interface (SPI) port for providing basic input/output system (BIOS) code;
    a debug port coupled to a processor of the computer supporting access to internal registers of the processor of the computer using a test access port on the processor of the computer, the security module being separate from the processor of the computer; and
    a secure memory storing a hash of an executable code and a second hash of a hash validation routine.

12. The security module of claim 11, further comprising a cryptographic module for validating digital signatures and establishing a secure channel between the security module and an external entity.

13. The security module of claim 11, further comprising a timer.

14. The method of claim 4, wherein the security module is a hardware security module having a controller separate from a processor of the computer, the security module comprising a secure memory.

* * * * *